US005788358A

United States Patent [19]

Davis

[11] Patent Number: 5,788,358
[45] Date of Patent: Aug. 4, 1998

[54] BRAKE LIGHT REMOVABLY ATTACHED TO REAR VIEW MIRROR

[76] Inventor: Richard E. Davis, 630 Liberty St., Erie, Pa. 16502

[21] Appl. No.: 851,327

[22] Filed: May 5, 1997

[51] Int. Cl.⁶ .................................................... B60Q 1/26
[52] U.S. Cl. ...................... 362/83.1; 362/80.1; 362/396; 340/479
[58] Field of Search ........................ 362/61, 80.1, 83.1, 362/83.3, 396; 340/479

[56] References Cited

U.S. PATENT DOCUMENTS 5,124,845  6/1992  Shimojo ...................... 362/83.1 X

*Primary Examiner*—Stephen F. Husar
*Attorney, Agent, or Firm*—Lovercheck and Lovercheck

[57] ABSTRACT

A brake light for an automobile having a windshield, a rear view mirror and a brake light circuit. The light is supported on the mirror by a support and keeper pivoted to the support for gripping the mirror holder. Second, third and fourth embodiment each having a support means and a keeper having a projection on the support means and spaced legs on the keeper that are received on each side of the projection. A second embodiment has external teeth on the projection that receive internal teeth on the keeper for holding the keeper in clamped relation with the projection to clamp a support member between them. A third embodiment has a projection and spaced legs on the support spaced outwardly from the projection. The legs on the keeper are received between the legs of the support means and the projection. The legs on the support have internal teeth that engage external teeth on the legs of the keeper and resilient means on the keeper legs hold the teeth on the keeper in engagement with the teeth on the projection.

11 Claims, 4 Drawing Sheets

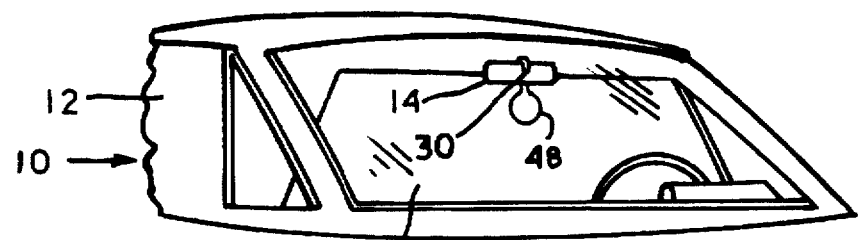
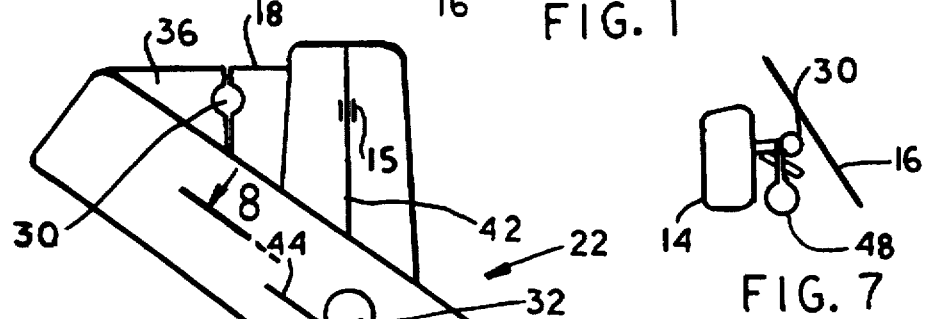
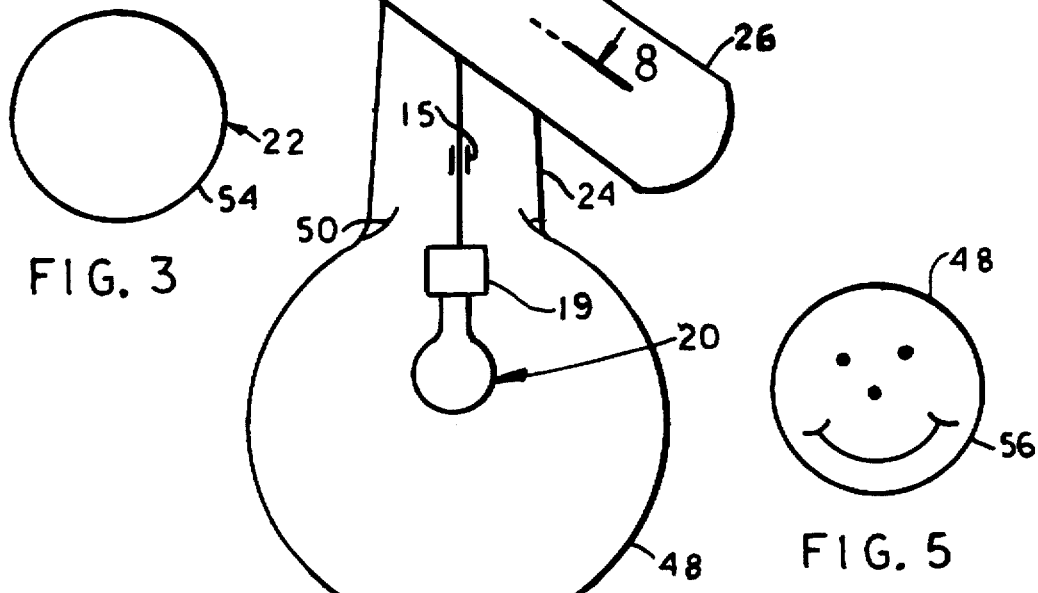
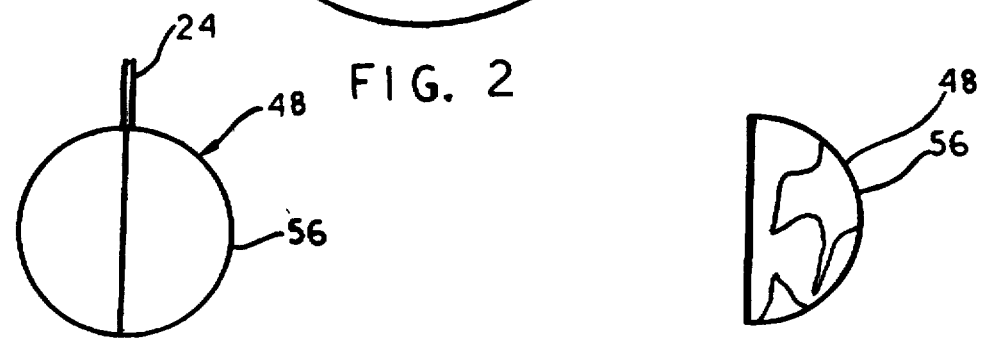

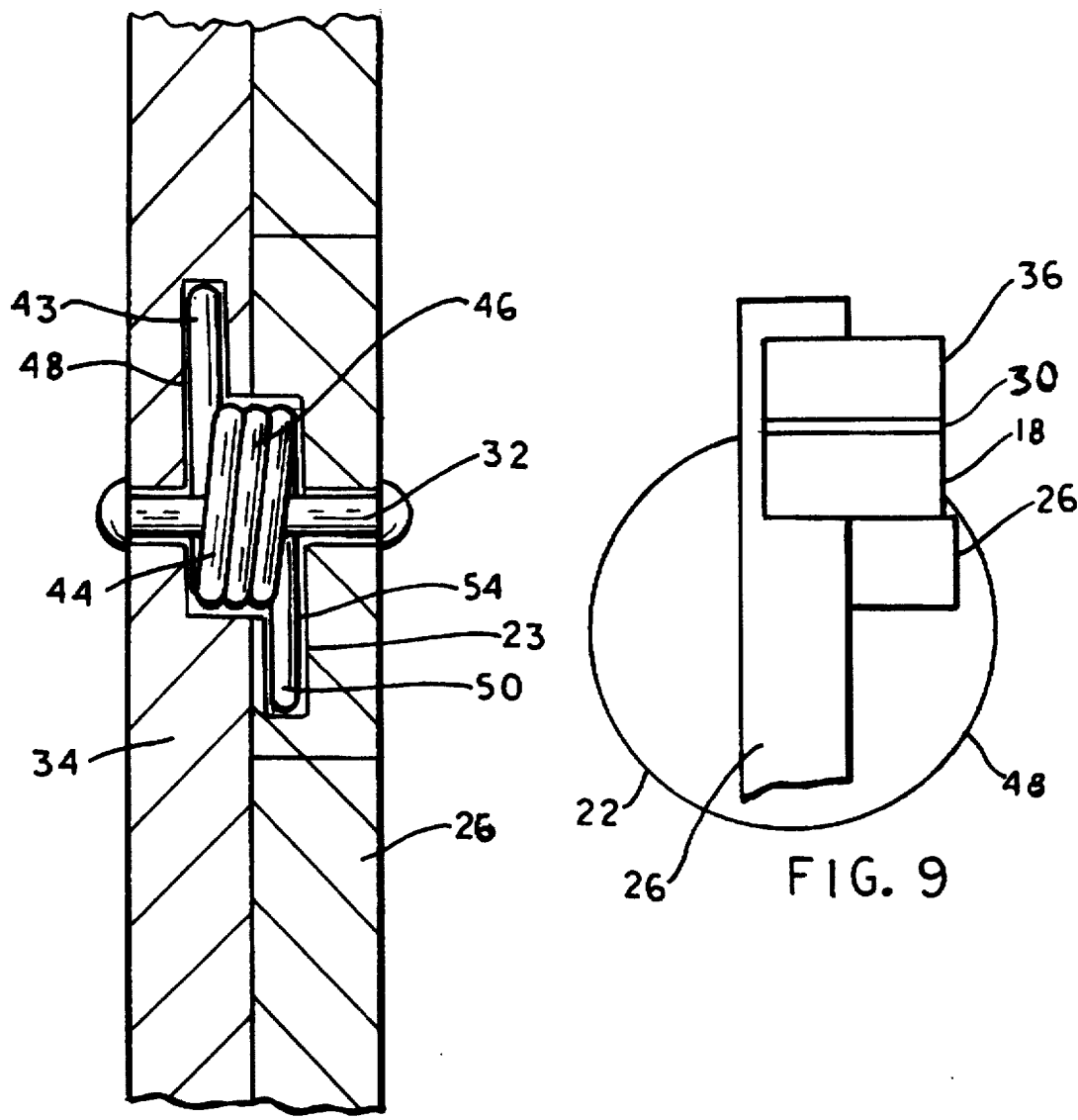

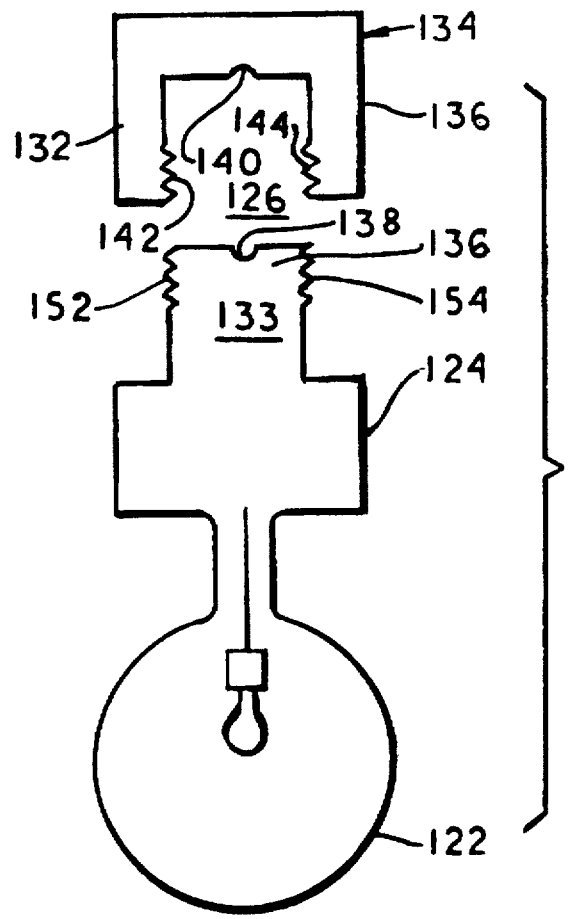
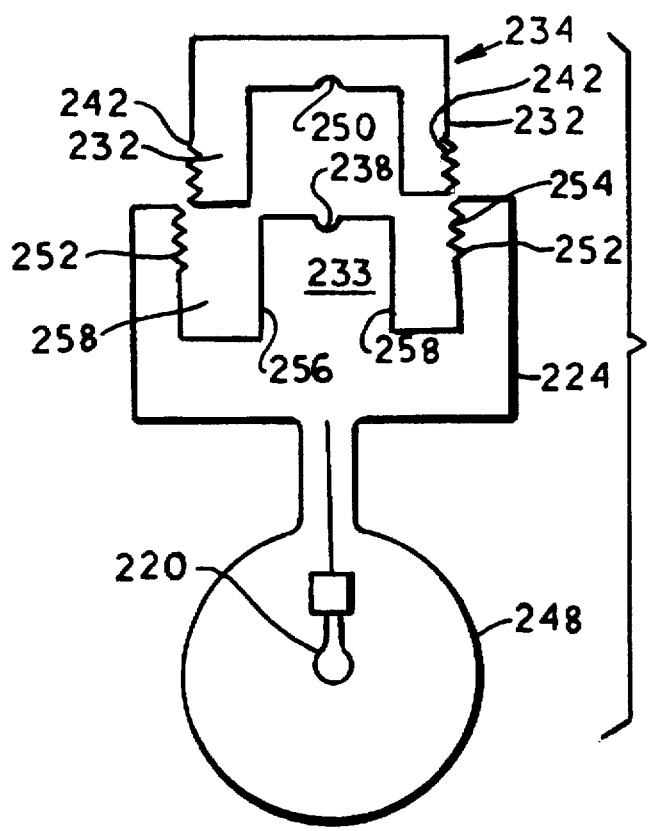

BRAKE LIGHT REMOVABLY ATTACHED TO REAR VIEW MIRROR

BACKGROUND OF THE INVENTION

This invention relates to automobile signals and more particularly to a brake light signal supported on the windshield of an automobile.

Presently vehicles are provided with signal lamps which are selectively actuated in a flasher sequence in order to indicate to other traffic and pedestrians, forwardly and rearwardly of the vehicle, of the vehicle operator's intention to make a turn in the direction of the flashing signal lamps.

Vehicles are also provided with rearwardly mounted and rearwardly directed lamps which are energized, whenever the vehicular transmission has been shifted into the reverse drive mode, to indicate to the traffic and pedestrians rearwardly of the vehicle that the vehicle was about to travel in reverse. If occurring at night time, the lamps would illuminate the path of travel for the vehicle operator.

SUMMARY OF THE INVENTION

This invention is more particularly directed to a driver communication signal which is located near the windshield of a vehicle and operatively connected to the vehicle brakes.

The signal is made simple, and economical in construction, relatively small in size and is intended for use inside of a vehicle. It is preferably mounted directly on the inside of a vehicle windshield and is located high or in a medial position. Ideally, it is placed behind the commonly known inside rear view mirror supported from or just below the windshield header bar. In such position, it does not obstruct the driver's vision and is visible over a greater range for those outside.

The brake light, according to the present invention, is for the purpose of promoting safety. It lets the driver communicate with other drivers. The communication means better judgement on the part of both drivers. Better judgement will result in less accidents, in less injuries and less property damage, and lower insurance premiums. The safety device according to the present invention can be used on all automobiles made by all manufacturers. The light according to the present invention can be seen from the sides from other cars as well as from the front and from the rear, which will suggest to the other drivers when it is advisable to stop or to proceed. The light can be positioned in the automobile so that it can be viewed from the front, rear or sides of the vehicle. Rubber grips attach the light to the vehicle, reduce noise and keep the light in position and prevent it from swinging around.

Applicant is aware of the following U.S. Pat. Nos. 2,084, 252; 2,139,420; 2,190,123; 2,650,355; 2,675,534; 3,665, 392; 4,912,607; 5,099,401; and, 5,126,926.

The inside mounting enables less expensive manufacture and assembly and is easier installed for an overall reduction in cost to assure greatest acceptance and use. The signal will provide a light visible to the driver to insure that the lights are working properly.

It is an object of the present invention to provide an improved signal for an automobile.

Another object of the invention is to provide an improved mounting for a signal light.

Another object of the invention is to provide a vehicle signal that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 1 is a partial isometric view of a part of an automobile with the brake light removably attached to the rear view mirror.

FIG. 2 is a front view of the lights shown in FIG. 1.

FIG. 3 is a front view of the light according to the invention.

FIG. 4 is a side view of the light according to the invention.

FIG. 5 is a rear view of the light according to the invention.

FIG. 6 is a side view of another embodiment of the invention.

FIG. 7 is a side view of the light removably attached to the support member of a rear view mirror.

FIG. 8 is a cross sectional view taken on line 8—8 of FIG. 2.

FIG. 9 is a partial top view of the light shown in FIG. 2.

FIG. 10 is a partial view similar to FIG. 1 of a second embodiment of a brake light.

FIG. 11 is a partial view of a third embodiment of the removable brake light.

DESCRIPTION OF THE PREFERRED EMBODIMENT(S)

Figure 12:
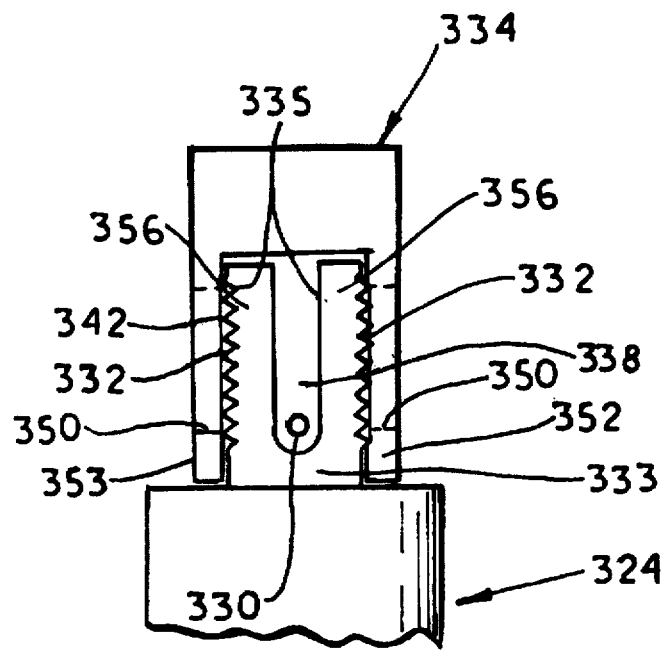
FIG. 12 is a front view of another embodiment of the invention.

Now with more particular reference to the drawings, shown is automobile 10 with window 12, rear view mirror 14 supported on windshield 16.

Brake light signal 22 is removably supported on automobile 10. Brake light signal 22 comprises bulb 20 connected to light circuit 42. Brake light signal 22 is supported on support member 24 and bulb 20 is connected to automobile brake light circuit 42 supported by line supports 15. When the automobile brake is engaged, bulb 20 will light. Brake light signal 22 also comprises light shield 48 that may be divided into front part 54 and rear part 56.

Light shield 48 is attached to the lower end of support member 24 at holder 55. Support member 24 is pivoted to keeper 26 by pivot 32. First resilient grip member 36 may be made of rubber and is fixed to keeper 26. Second resilient grip member 18, may also be made of rubber and is fixed to support member 24. Holders 30 are received between first resilient grip member 36 and second resilient grip member 18. Holder 30 is attached to windshield 16. Helical spring 44 is supported around pivot 32 in recess 23 and end 43 of spring 44 is received in recess 52 and urges keeper 26 to swing toward support 24 to hold first grip member 36 in clamped relation to second grip member 18.

Front part 54 of light shield 48 is red to permit the light to be seen by persons in front of the vehicle. Rear part 56 of light shield 48 could be opaque, black, yellow or decorated with a character of an appropriate kind, to prevent the light from shining into the eyes of the driver.

The embodiment of the invention shown in FIG. 10 shows a combination of support member 124 and keeper 134 for supporting brake light 122. Keeper 134 is generally U-shaped having first resilient leg 132 and second resilient leg 136. Support member 124 has projection 133 to hold a mirror support. Projection 133 is adapted to be received between legs 132,136. The inner surface of legs 132,136 have teeth 142,144 that engage teeth 152,154 on projection 133 to hold keeper 134 in clamped relation to projection 133.

The embodiment of the invention shown in FIG. 11 shows a combination of support member 224 and keeper 234. Keeper 234 is generally U-shaped having resilient legs 232 having external teeth 242. Recess 250 is formed in keeper 234 between legs 232 to receive a mirror support. Support member 224 has projection 233 that has recess 238 and parallel sides 256. Legs 252 are spaced outwardly from sides 256 forming spaces for receiving legs 232 between them. Legs 232 have external teeth 242, and legs 252 have internal teeth 242. Legs 252 are resilient so that they spring outwardly to allow teeth 242 to slide down between teeth 242 and projection member 233. Light shield 248 is similar to light shield 48 and in FIG. 2, will be supported on support member 224.

Figure 13:
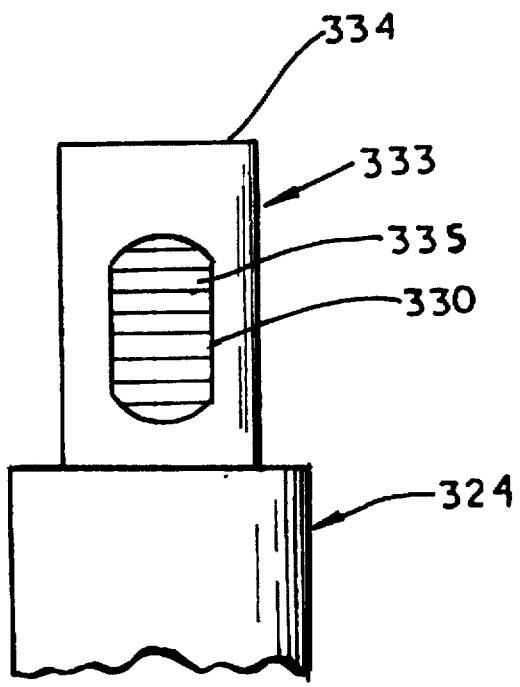
FIG. 13 is a side view of the embodiment of invention shown in FIG. 12.

The embodiment of the invention shown in FIGS. 12 and 13 shows a combination of support member 324 and keeper 334.

Support member 324 has projection 333 that has recess 338 and parallel legs 356 and internal teeth 335. Recess 338 is formed in projection 333 between resilient legs 356. Recess 338 will receive mirror support 330.

Keeper 334 has spaced legs 352 with internal teeth 335. Spaced legs 356 on support 324 are resilient so that they spring inwardly to allow external teeth 342 to slide down between internal teeth 335 on keeper member 333. A light shield, similar to light shield 148 and in FIG. 2, will be supported on support member 324.

To release support 324 from keeper 334, the operator will place his thumb and fore finger in windows 350 in keeper 334 and squeeze sides 356. The operator's thumb and fore finger engage internal teeth 335 and will force legs 356 toward each other causing external teeth 342 to move inwardly away from internal teeth 335 thereby allowing support 324 to be removed and allowing mirror support 330 to be removed from the recesses 338.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination a brake light and an automobile having a rear view mirror, a brake light circuit and a windshield;

said rear view mirror being supported on said automobile adjacent the top of said windshield by a mirror support means;

a bracket means supporting said brake light on said mirror support means;

said brake light being connected to said brake light circuit of said automobile providing a brake light signal visible to persons ahead of said automobile.

2. The combination recited in claim 1 wherein said bracket means comprises a support member and a keeper;

resilient means connecting said keeper to said support member for urging said keeper toward said support member to clamp said mirror support means between said support member and said keeper.

3. The combination recited in claim 2 wherein said keeper member has teeth thereon adapted to engage teeth on said support member for holding said keeper member in clamped relation to said support member.

4. The combination recited in claim 1 wherein said bracket means comprises a support member and a keeper member;

said keeper member comprising a generally U-shaped member having a first leg and a second leg;

a first recess on said support member and a second recess in said support member;

said recesses receiving said legs;

a tooth means on said keeper member adapted to engaged tooth means on said support member for holding said keeper with said holder means clamped therebetween.

5. The combination recited in claim 1 wherein said bracket comprises a support member and a keeper;

said keeper being generally U-shaped member having two spaced legs;

said projection having spaced legs;

said legs of said projection being adapted to be disposed between said legs of said keeper;

said legs of said keeper engaging said legs of said projection holding said projector between said legs of said keeper;

a window in each said keeper leg through which the operator can engage said legs of said projection for forcing said legs of said projector out of engagement with said legs of said keeper for removal of said keeper from said support.

6. The combination recited in claim 5 wherein said keeper legs have internal teeth and said projection legs have external teeth engaging said internal teeth;

recesses in said keeper legs through which said operator can engage said projection legs for forcing said external teeth out of engagement with said internal teeth.

7. In combination a light and a holder means for holding a mirror on a rear view mirror holder above a windshield of a vehicle comprising;

a support and a keeper swingably connected to said support;

spring means received between said keeper said support and engaging said support and said keeper;

said spring means urging said keeper toward said support whereby said holder means is clamped between said keeper and said support;

connecting means for connecting said light to a brake light circuit of said vehicle.

8. The combination recited in claim 7 wherein said support is an elongated member having a first end and a second end;

a first grip means on said second end of said support member and a second grip means on said keeper adapted to engage said holder means.

9. The combination recited in claim 8 wherein said keeper has a handle end and said second grip means is attached to said first end of said keeper.

10. The combination recited in claim 9 wherein said light has a red front part and a opaque rear part.

11. The combination recited in claim 10 wherein said first part of said light is red and said second part of said light has a decorative figure formed thereon.

* * * * *